US010908117B2

(12) United States Patent
Bhat et al.

(10) Patent No.: US 10,908,117 B2
(45) Date of Patent: Feb. 2, 2021

(54) LOW IMPEDANCE SENSOR FOR LOW DENSITY MATERIALS

(71) Applicant: InSyte Systems, Inc., Newark, CA (US)

(72) Inventors: Jerome Chandra Bhat, Palo Alto, CA (US); Jim Chih-Min Cheng, Fremont, CA (US); Eric Paul Lee, Mountain View, CA (US)

(73) Assignee: InSyte Systems, Inc., Newark, CA (US)

(*) Notice: Subject to any disclaimer, the term of this patent is extended or adjusted under 35 U.S.C. 154(b) by 54 days.

(21) Appl. No.: 16/254,300

(22) Filed: Jan. 22, 2019

(65) Prior Publication Data

US 2019/0227026 A1    Jul. 25, 2019

Related U.S. Application Data

(60) Provisional application No. 62/620,963, filed on Jan. 23, 2018, provisional application No. 62/620,372, filed on Jan. 22, 2018.

(51) Int. Cl.
```
G01N 27/407      (2006.01)
G01N 27/404      (2006.01)
G01N 27/30       (2006.01)
G01N 27/416      (2006.01)
```
(52) U.S. Cl.
CPC ....... *G01N 27/4078* (2013.01); *G01N 27/304* (2013.01); *G01N 27/404* (2013.01); *G01N 27/407* (2013.01); *G01N 27/4166* (2013.01)

(58) Field of Classification Search
None
See application file for complete search history.

(56) References Cited

U.S. PATENT DOCUMENTS

| | | |
|---|---|---|
| 4,049,503 A | 9/1977 | Becker et al. |
| 4,051,006 A | 9/1977 | Neti et al. |
| 4,227,984 A | 10/1980 | Dempsey et al. |
| 4,668,374 A | 5/1987 | Bhagat et al. |
| 4,820,386 A | 4/1989 | LaConti et al. |
| 5,116,650 A | 5/1992 | Bowser |
| 5,624,546 A | 4/1997 | Milco |
| 6,284,545 B1 | 9/2001 | Warburton et al. |

(Continued)

FOREIGN PATENT DOCUMENTS

| | | |
|---|---|---|
| WO | 2005015195 A1 | 2/2005 |
| WO | 2016029003 A1 | 2/2016 |
| WO | WO2017201477 A1 | 11/2017 |

OTHER PUBLICATIONS

J.R. Stetter et al., "Amperometric Gas Sensors—A Review", Chemical Reviews, Jan. 18, 2008, pp. 352-366, vol. 108, No. 2., American Chemical Society, Washington, DC, USA.

(Continued)

*Primary Examiner* — J. Christopher Ball
(74) *Attorney, Agent, or Firm* — Intrinsic Law Corp.

(57) ABSTRACT

An electrochemical gas sensor device with small physical footprint is disclosed. The electrodes within the element are arranged about the electrolyte such that the electrical impedance of the sensor is minimized. This results in a fast stabilization after detecting gasses and enables rapid changes in bias voltage to target different gasses. Gasketing elements, or alternative designs, are included to eliminate the diffusion of gasses between the electrodes within the cell.

22 Claims, 7 Drawing Sheets

(56) References Cited

U.S. PATENT DOCUMENTS

| | | |
|---|---|---|
| 7,491,547 B1 | 2/2009 | Warburton |
| 7,771,654 B1 | 8/2010 | Moore et al. |
| 9,983,164 B1 | 5/2018 | Allen et al. |
| 9,989,492 B1 | 6/2018 | Cheng et al. |
| 10,132,699 B1 | 11/2018 | Pillars et al. |
| 10,139,382 B2 | 11/2018 | Motayed et al. |
| 2007/0017193 A1 | 1/2007 | Nishio et al. |
| 2014/0311905 A1 | 10/2014 | Stetter et al. |
| 2014/0355381 A1 | 12/2014 | Lal et al. |
| 2015/0241375 A1 | 8/2015 | Merz et al. |
| 2015/0346138 A1 | 12/2015 | Allen et al. |
| 2017/0131230 A1 | 5/2017 | Papageorge et al. |
| 2017/0336343 A1 | 11/2017 | Bhat et al. |
| 2019/0041371 A1 | 2/2019 | Dinsmore |

OTHER PUBLICATIONS

SPEC Sensors, "SPEC Sensor Operation and Performance Considerations", SPEC Sensor Operation Overview, May 2016, pp. 1-6, SPEC Sensors, LLC.

ISA, "International Search Report", PCT/US2017/033649, dated Oct. 2, 2017.

International Searching Authority, International Search Report, PCT Application No. PCT/US19/14573, dated Apr. 10, 2019.

International Searching Authority, International Search Report, PCT Application No. PCT/US19/14585, dated Apr. 19, 2019.

M. T. Carter et al., "Printed Amperometric Gas Sensors", ECS Transcactions, 2012, pp. 211-220, vol. 50, No. 12., The Electrochemical Society.

P. Kubersky et al., "Amperometric NO2 Sensor Based on Solid Polymer Electrolyte for Screen Printing Technology", The 14th International Meeting on Chemical Sensors, 2012, pp. 1680-1683, Association for Sensors Measurement.

P. Kubersky et al., "An Electrochemical NO2 Sensor Based on Ionic Liquid: Influence of the Morphology of the Polymer Electrolyte on Sensor Sensitivity", Sensors, 2015, pp. 28422-28434, MDPI AG.

Barzana et al., "Enzyme-Catalyzed, Gas-Phase Reactions", Applied Biochemistry and Biotechnology, 1987, pp. 25-34, vol. 15, The Humana Press Inc.

Parvaresh et al., "Gas Phase Transesterification Reactions Catalyzed by Lipolytic Enzymes", Biotechnology and Bioengineering, 1992, pp. 467-473, vol. 39, John Wiley & Sons, Inc.

M. T. Carter et al., "Amperometric Gas Sensors with Ionic Liquid Electrolytes", 224th ECS Meeting, 2013, Abstract #2617, The Electrochemical Society.

G. J. Maclay et al., "Microfabricated Amperometric Gas Sensors", IEEE Transactions on Electron Devices, Jul. 1988, pp. 793-799, vol. 35, No. 6, IEEE.

J. R. Stetter et al., "Sensors, Chemical Sensors, Electrochemical Sensors, and ECS", Journal of The Electrochemical Society, 2003, pp. S11-S16, vol. 150, No. 2, The Electrochemical Society, Inc.

LOW IMPEDANCE SENSOR FOR LOW DENSITY MATERIALS

RELATED APPLICATIONS

This application claims the benefit and priority of Provisional Application Ser. No. 62/620,963, entitled "Low Impedance Sensor for Low Density Material", filed on Jan. 23, 2018, as well as Provisional Application Ser. No. 62/620,372, entitled "Chip-Scale Sensing Device for Low Density Material", filed on Jan. 22, 2018, both of which are hereby incorporated by reference.

TECHNICAL FIELD

This invention relates to the sensing and identification of low-density materials, such as gasses, and in particular to the sensing and identification of low-density materials by an electrochemical cell in conjunction with a sensing circuit having low electrical impedance.

BACKGROUND

Given the changes in the earth's atmosphere, precipitated by industrialization and natural sources, as well as the dramatically increasing number of household and urban pollution sources, the need for accurate and continuous air quality monitoring has become necessary to both identify the sources and warn consumers of impending danger. Tantamount to making real-time monitoring and exposure assessment a reality is the ability to deliver, low cost, small form factor, and low power devices which can be integrated into the broadest range of platforms and applications.

There are multiple methods of sensing distinct low-density materials such as gasses. Common methods include nondispersive infrared spectroscopy (NDIR), the use of metal oxide sensors, the use chemiresistors, and the use of electrochemical sensors. The present invention pertains to electrochemical sensors.

One drawback with a conventional electrochemical sensor is that its size (e.g., volume of electrolyte and size of electrodes) is relatively large so that it takes a long time to stabilize when subjected to the target gas. Further, since the change in current in response to a gas is small, there is a low signal to noise ratio, and there are losses and RF coupling due to metal traces leading to processing circuitry external to the sensor, further reducing the signal to noise ratio. Additionally, the electrochemical cell body is typically a polymer that cannot withstand temperatures above 150° C., and the electrolyte comprises an aqueous acid that cannot withstand temperatures above approximately 100° C. This prevents the electrical contacts from being soldered to a printed circuit board by reflowing the solder (typically at 180-260° C.) and prevents the used of some heat-cured conductive adhesives such as silver-containing epoxies, or anisotropic conductive films or pastes (typically at cured at 120-150° C.).

There are multiple methods of sensing distinct low-density materials such as gasses. Common methods include nondispersive infrared spectroscopy (NDIR), the use of metal oxide sensors, the use chemiresistors, and the use of electrochemical sensors. Some electrochemical sensors are also known to those skilled in the art. In this application, we describe improved small form-factor electrochemical sensor devices capable of production as individual components or in bulk prior to singulation. The present devices can be effectively incorporated into other electronic products such as mobile devices and can also comply with modern standards for operation in challenging environments including in moist and/or dusty environments.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

An aspect of the inventions described herein is the physical arrangement of the electrodes in the electrochemical cell in relation to the electrolyte such that the electrical impedance of the cell is minimized. This in-turn enables the electrochemical cell to respond more rapidly to changes in applied bias. Another aspect is the physical arrangement of the electrolyte in the electrochemical cell so as to eliminate diffusion of the gas between electrodes.

Some embodiments are directed to n electrochemical sensing device, comprising a package panel; a lid panel; a solid or semi-solid electrolyte; a plurality of electrodes disposed in one or more electrode chambers, each electrode in contact with said electrolyte; the plurality of electrodes in gas communication with an outside environment through a gas port through via in one of said panels; and a seal gas-isolating at least one electrode chamber from any other electrode chambers.

Other embodiments are directed to a method for making an electrochemical sensor device having a plurality of sensor electrodes, comprising forming a package panel; forming a lid panel; creating a plurality of through vias in at least one of said lid and package panels, including an gas port through via that connects at least one electrode chamber containing a respective electrode with an exterior environment; forming one or more gaskets on an interior face of at least one of said panels to gas-isolate at least said electrode chamber from any other electrode chambers; attaching electrical contacts to one or both of said lid and package panels; forming a solid or semi-solid electrolyte layer disposed between a plurality of electrodes, including said electrode and another electrode, and mating an interior face of said lid panel and an interior face of said package panel so as to define said electrode chamber and any other electrode chambers, wherein the respective electrode and other electrodes are simultaneously contacting the solid or semi-solid electrolyte layer.

BRIEF DESCRIPTION OF THE DRAWINGS

For a fuller understanding of the nature and advantages of the present technology, reference is made to the following detailed description of preferred embodiments and in connection with the accompanying drawings, in which.

DETAILED DESCRIPTION

Figure 1:
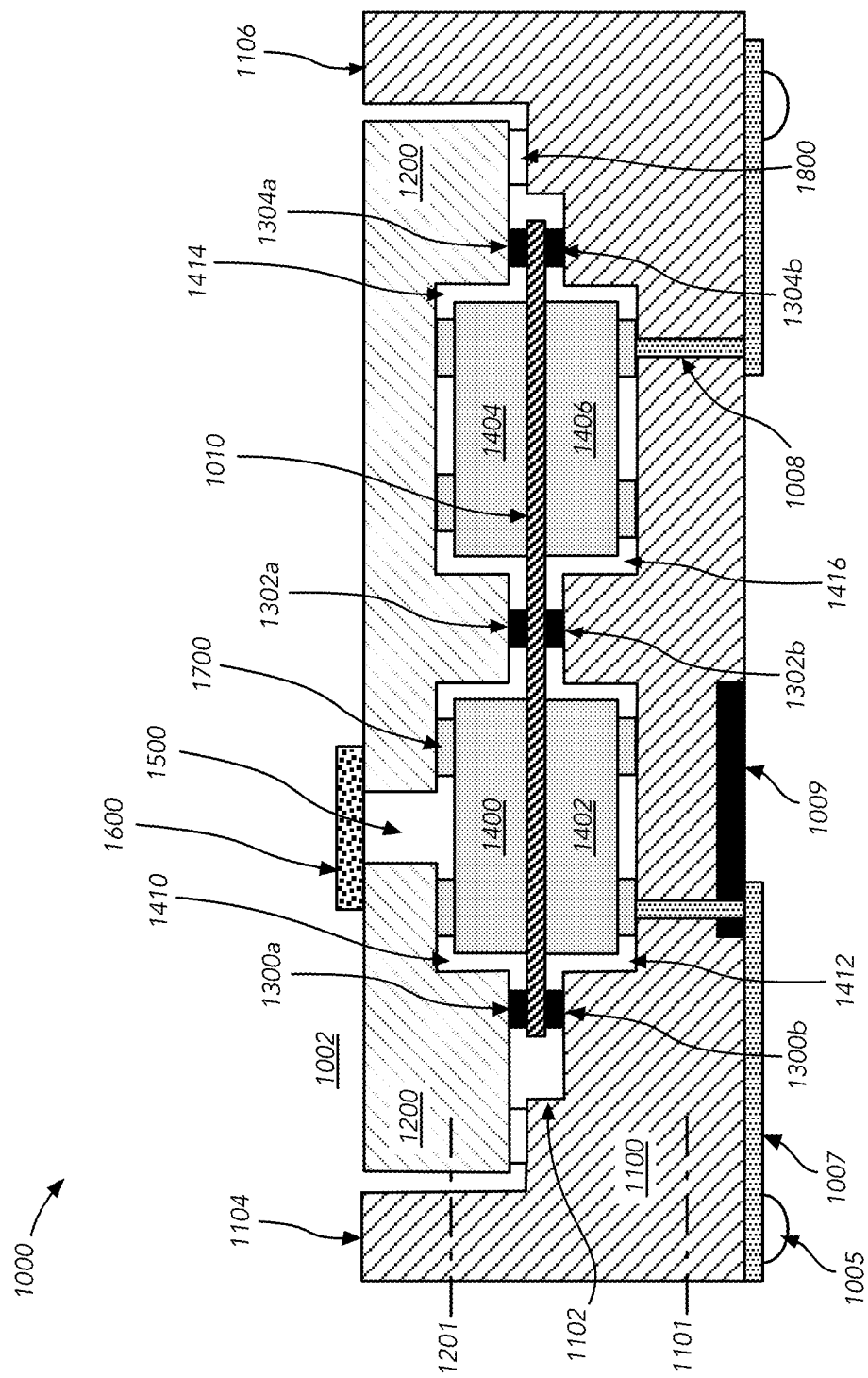
FIG. 1 is a cross-sectional view of an electrochemical sensor device in accordance with one embodiment of the invention comprising a partially-enclosed cavity package between two panels, a plurality of electrodes, a solid or semi-solid electrolyte, and gasketing elements disposed on either side of the electrolyte.

In an electrochemical sensor, a sensor electrode (also known as a working electrode) contacts a suitable electrolyte. The sensor electrode typically comprises a catalytic metal that reacts with the target gas and electrolyte to release or accept electrons, which creates a characteristic current in the electrolyte when the electrode is properly biased and when used in conjunction with an appropriate counter-electrode. The current is generally proportional to the amount of target gas contacting the sensor electrode. By using a sensor electrode material and bias that is targeted to the particular gas to be detected and sensing the current, the concentration of the target gas in the ambient atmosphere can be determined.

One or more embodiments of the present invention are directed to an electrochemical sensing device, which may be manufactured on or using a set of panels, plates, package members, lid or cover members, or other suitable components (collectively referred to herein as "panels" for simplicity), as will be described and illustrated herein. The panels are generally planar, at least on one face thereof, as will be explained in more detail below, and may be generally described by a thickness dimension, although their thickness does not need to be constant across a given panel, for example where a panel is machined or etched in some areas to form recesses or varying thicknesses at such areas. One panel of the sensor devices is referred to herein as a "package panel", and the other panel is referred to as a "lid panel", but this nomenclature should not limit the generality of the invention and should not, for example, be taken as implying that the package panel must be on the bottom and the lid panel on the top of the device (though that is of course one possibility).

At a general level, the invention permits the formation of a sensor chamber in a volume between at least a pair of such panels, with the panels substantially disposed parallel to one another, for example one panel above the other in a horizontal orientation. Obviously, re-orienting the device in any direction in space, for example so that it is sideways, and the panels are oriented vertically, is equally valid and comprehended by this disclosure even though the illustrations and description may refer to a package panel, lid panel or a top and bottom panel or other terms, these should be taken broadly and generally without limitation. The panels described can be scaled to form one discrete sensor device (meaning, having dimensions approximately the same as the individual sensor device) or they may be scaled large enough to construct an array of several or many such sensor devices using a single pair of shared or common panels, after which the individual formed sensor devices can be cut apart, separated, diced (i.e., singulated) from the panels.

In some aspects, ceramic, glass, polymeric materials, semiconducting materials or other substrates can be employed in making the panels of the present designs. Some embodiments utilize co-fired ceramic wafers for the base and/or lid units. These may be made by: 1. Preparing individual ceramic sheets, slabs or layers, 2. Forming the through vias (electrical conducting filled vias or gas port vias) into one or more layers, 3. Printing electrical interconnect traces on the layers, e.g., to fill the electrically-conducting vias, 4. Aligning the layers with respect to one another, and 5. Co-firing the layers together. This process can be used as reasonable for any given embodiment disclosed herein The present device is preferably compact in size, relatively easy and inexpensive to manufacture in large numbers, and can have wide applications beyond prior sensor designs. In an aspect, the present sensor devices can be used to detect certain gasses in an atmosphere or environment of the sensor devices. Many configurations can be designed based on the current disclosure. The present disclosure can utilize a number of different electrochemical sensors, which may include examples described in Publication US2017/0336434, incorporated herein by reference, directed to integration of an electrochemical cell with an electronic circuit in a small form-factor package. Some specific preferred embodiments are presented below, but those skilled in the art will appreciate how to extend this disclosure, using a variety of materials, dimensions and arrangements that are all comprehended by this disclosure and its appended claims.

FIG. 1 illustrates an embodiment of an electrochemical cell or device 1000, which may comprise or be part of an electrochemical sensor apparatus, and which may be included therein. The device 1000 is based on a solid or semi-solid electrolyte 1010 in contact with a plurality of sensor electrodes 1400, 1402, 1404, 1406. The device 1000 is generally constructed on a double-panel or double-panel architecture having a first panel 1100 (e.g., a package panel) and a second panel, substrate or panel 1200 (e.g., a lid panel) that together at least partially define one or more sensor chambers 1410, 1412, 1414, 1416. For example, the panels 1100 and 1200 may substantially describe lower and upper walls of the one or more sensor chambers, for example, substantially defining the horizontal bounds of the sensor chambers. In addition, other elements can further define the one or more sensor chambers, for example, gasketing materials 1300a/1300b, 1302a/1302b, 1304a/1304b as shown. The panels 1100 and 1200 may be constructed as described further herein, and are generally in respective parallel planes 1101, 1201 (e.g., depicted horizontally). The panels 1100 and 1200 may be further contoured, etched, carved, machined, cast or formed (depending on their composition and purpose) to define a shape, including rising or dropping edges or shoulders (e.g., 1102) that further describe the one or more sensor enclosures or chambers. In the exemplary and non-limiting embodiment shown, the package panel 1100 is dished in some places to hold the lower electrodes 1402, 1406, and the upper, lid or lid panel 1200 is formed to hold the upper electrodes 1400, 1404. Those skilled in the art will appreciate that the electrodes and their respective chambers can be positioned and sized to accommodate a variety of shapes and sizes of electrodes. Thus, the configurations shown in these illustrations are merely given by way of example. In one embodiment, the package panel 1100 (or the lid panel 1200) could extend laterally beyond the other so as to hold the other therein. For example, as shown, the package panel 1100 acts to substantially define the bottom of the device 1000 as well as its lateral walls 1104, 1106. The converse can of course be created if the lid panel 1200 extended to meet or surround the package panel 1100, either of which are comprehended herein. Furthermore, while the present example shows the side walls 1104 and 1106 being formed by a panel (1100), the sides of the device 1000 can be substantially at least partially defined by spacer panels as described by the present inventors (e.g., a third layer, panel, interposer or spacer that is sandwiched between the shown panels 1100 and 1200 to separate the same and allow some space for the electrodes within the electrode chambers. Depending on the particular configuration and arrangement of the base/lid panels, an adhesive 1800 may be used to secure the two main parts together. Bonding of the lid panel 1200 and base elements generally may be performed via, for example, an adhesive, a solder, or a glass.

Still further, the electrolyte material 1010, which may comprise a layer, slab or sheet of electrolyte material, can divide or define said sensor chambers. Specifically, in the shown embodiment, each sensor electrode 1400, 1402, 1404 and 1406 is disposed in its own defined chamber (which we may sometimes refer to as an electrode chamber) and be in gas isolation from the other electrode chambers. The electrochemical sensor electrodes are respectively disposed in the various chambers. In this example, working electrode 1400 is in its own respective electrode chamber 1410, which is at least partially able to exchange a low-density fluid (e.g., a gas) with the outside environment 1002 surrounding the device 1000 through a gas port through via 1500 in the respective panel 1200.

Preferably, the working electrode 1400 is gas-isolated from the other electrodes to prevent movement or diffusion of gas from chamber 1410 into the other electrode chambers 1412, 1414, 1416, and vice versa. However, other electrodes or electrode chambers may be gas isolated from one another as well or in addition. The gas isolation is accomplished using barriers or seals (e.g., gasket materials or structural barriers) that prevent gas movement between the chambers. Here, electrolyte 1010 and gaskets 1300a and 1302a prevent gas in electrode chamber from diffusing into neighboring electrodes or electrode chambers. This confines outside atmospheric or environmental gas at 1002 to only make contact with working electrode 1400 that is permitted to receive such gas through its gas port through via 1500. It is to be understood that the working electrode 1400 is not the only electrode chamber that could be provided with a gas port through via. One or more of the other electrodes may be provided with external gas through a provided gas port through via as well. Similarly, when sealing the respective one or more electrode chambers from one another in various optional examples, the other electrode chambers may be the ones sealed instead of and/or in addition to the working electrode chamber. For example, a seal comprising a gasket as described herein can be applied to, above and/or below the solid or semi-solid electrolyte so as to gas isolate any or all of the electrodes and electrode chambers from one another. The gasket is an example of a gas seal generally, which can be applied as described. The gas seal or gasket may be in direct contact with the seal or gasket material by being adhered to or pressed against, bonded to, mated with, or attached to the solid or semi-solid electrolyte itself in one or more embodiments of the invention (generally thus the seal may be in contact with the electrolyte using any such method).

An optional gas filter 1600 can block or filter or control if and what passes through filter 1600, for example by size-limiting any particulates that might enter working electrode chamber 1410. Filters as utilized in this and other present embodiments may also for example filter out particular chemical species from entering the chamber, e.g., by absorbing them or catalyzing or otherwise reacting them into other species. Filters may also preclude liquid or solid elements from entering the working electrode chamber. Hydrophobic and/or oleophobic materials may optionally be used in the present filters. Also, the filters may include sealed sides or edges that allow them to be pressed against a housing or casing or other member to be more water and/or dust resistant. In some aspects, the sensor device may be IP6x compliant where the sensor and its packaging and housing generally achieve certain standard of operation in challenging environments. Filters such as those disclosed in Provisional Applications 62/730,076 and 62/750,926, which are incorporated herein by reference, may be used as a basis for some filter designs and compositions. But such designs may be adapted, added or omitted in the present embodiments as best suits a specific purpose.

In some embodiments, as the electrolyte 1010 itself has limited diffusivity and can act to stop or reduce the diffusion of gas therethrough. In some aspects, the electrolyte layer itself is also gasketed (e.g., 1300a/b, 1302a/b, 1304a/b) to help control the movement of gas among different volumes within the sensor chamber or chambers of the device.

The gaskets (e.g., 1300, 1302, 1304) may comprise an adhesive, or may comprise a compliant or somewhat compressible or deformable material and may comprise a material that is chemically resistant to chemical attacks from the electrolyte 1010. In some alternative examples, the gasket material may comprise: fluoropolymer, fluorosilicone, polyimide, butyl or other rubber compounds, a rubber derivative, epoxy, a silicone, or an acrylic. The gasket may be deposited as or may be compressed to a thickness of less than one millimeter, and in some examples to a thickness of about 10 to 100 microns, however, such dimensions are determined by a given application and those skilled in the art will appreciate that these exemplary dimensions are not exhaustive or limiting of the scope of this invention.

In an aspect, the lid or lid panel 1200 and the package panel 1100 are bonded together under pressure such that after bonding, the contact points of the gasket and the electrolyte 1010 and the gasket and the lid panel 1200 are in compression, thereby providing a seal against gas diffusion. The ensemble is such that each of the electrodes 1400, 1402, 1404, 1406 is simultaneously held in compression against the electrolyte 1010, thereby providing a consistent electrical and electrochemical contact to the electrolyte.

The electrochemical sensor device 1000 may function adequately with only the formation of a single gas seal (or gasket) stopping diffusion between the working electrode 1400 and the one or more other electrodes 1402, 1404, 1406 in the cell. In this situation, the other gasketing seals shown in the above example may be eliminated. But various gasketing schemes are possible, and some examples and preferred embodiments are given herein for illustration.

Although the gasket substantially acts to eliminate gas from the outside world from diffusing from the vicinity of the working electrode to one or more of the other electrodes within the sensor, secondary reactions occurring at the other electrodes may result in evolution of one or more secondary gasses at these electrodes. In this case, it may be beneficial to eliminate diffusion of these one or more secondary gasses to one or more of the other electrodes. Gasketing of each of the electrodes enables this.

Whereas in the current embodiment, the lid and the base of the package are bonded together under compression, the lid and the package may also simply be held together in compression, for example by spring clips or other external means providing a necessary force to hold the elements of the sensor device against each other.

In one embodiment, the electrode materials may comprise similar or nominally identical materials, however, in other embodiments the electrodes may comprise different materials. For example, whereas the working electrode 1400 may comprise a porous material such as a carbon paper, a carbon cloth, or any other porous, electrically-conducting matrix and a catalyst such as platinum, palladium, ruthenium, rhodium, silver, nickel, iron, vanadium, other transition metals and alloys thereof; aluminosilicates, alumina, boron nitrides, other semiconductor catalysts, and mixtures thereof. One or more of the other electrodes may comprise a non-porous material, may comprise a different catalyst to the first catalyst, or may not comprise any catalyst.

Whereas in the current embodiment, the electrodes are shown as being attached to the package, for example via a conducting epoxy, other embodiments exist in which ones of the electrodes are simply held in mechanical compression against electrical contact pads on the inside of the cavity package, the conducting epoxy and/or contact pads indicated by 1700 in the drawing.

One or more conducting through vias 1008 may be established to conduct electrical signals or current to and from contacts 1005 on an exterior surface of one of the panels (for example but not limited to package panel 1100). The contacts can further connect the sensor to an integrated circuit (IC) 1009 and/or other electrical components, e.g., using solder connections or conducting bumps, or other conducting contact methods commonly used to make electrical interconnections—for example, a flex cable, an electrical connector, anisotropic conducting paste, anisotropic conducting film, or spring contacts.

Figure 2:
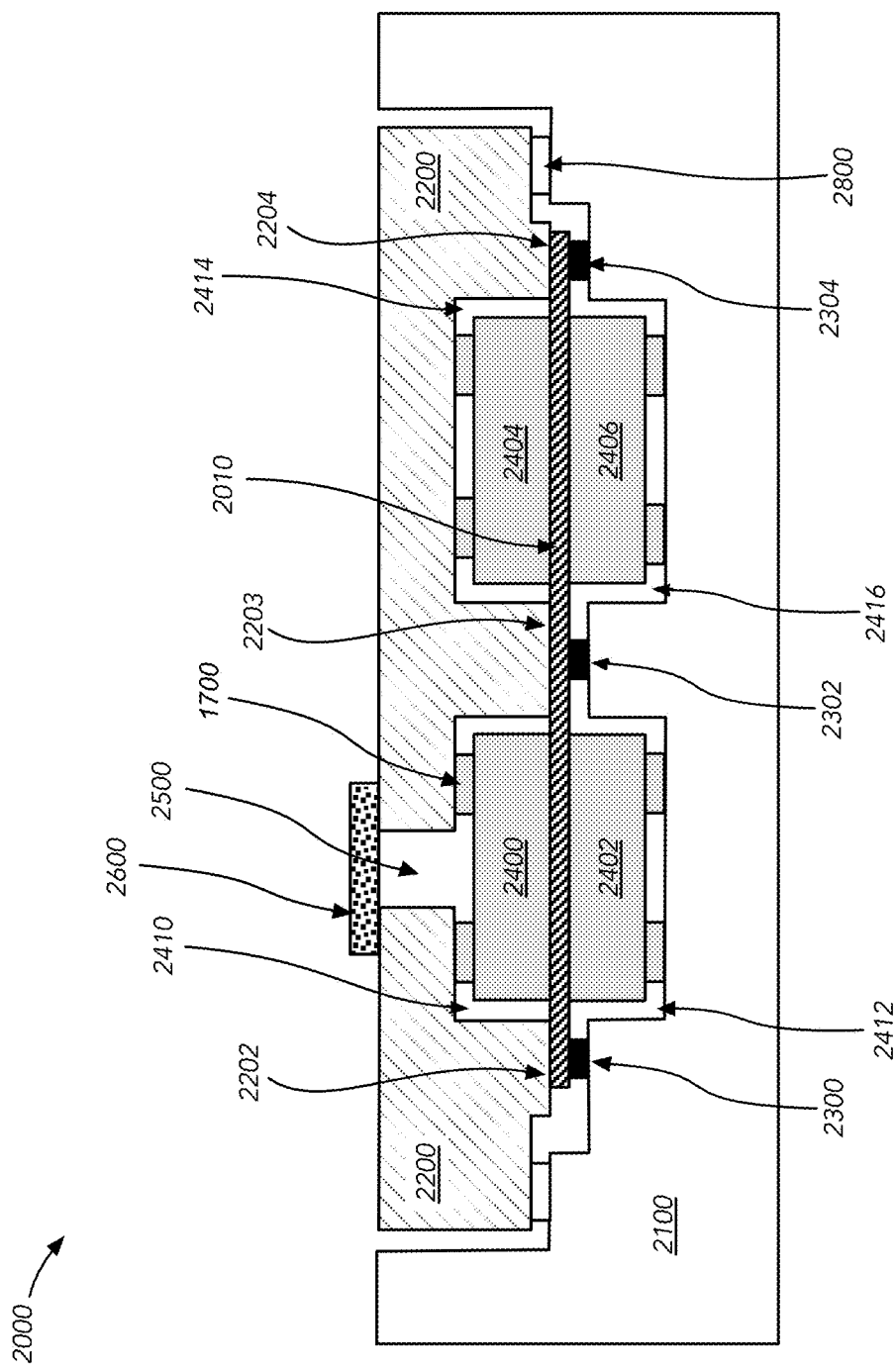
FIG. 2 is a cross-sectional view of an electrochemical sensor device, in accordance with one embodiment of the invention, comprising a sensor chamber defined by a package panel, a lid panel, a plurality of electrodes, a solid or semi-solid electrolyte, and gasketing elements disposed on one side of the electrolyte.

FIG. 2 illustrates an electrochemical sensor device 2000 having two main plates, substrates or panels that form an outer structure of the device and enclose an electrochemical sensor therein. Recall that in the present examples the use of a panel to define two or more structural sides of a device can be done where the panels are individual and discrete covers of a single sensor device, or alternatively, larger panels can be employed to create a plurality of sensor devices on such common shared panels, which are later cut apart to singulate the devices therefrom.

The top, cover or lid panel 2200 is disposed on the lower, base or package panel 2100 as before to form a sensor chamber having one or more electrode chambers defined therein. Each electrode, e.g., working electrode 2400, reference electrode 2402, optional fourth electrode 2404, and counter electrode 2406 is contained in such an electrode chamber (respectively, 2410, 2412, 2414, 2416). As stated before, the number, position, geometry, composition and arrangement of the electrodes can vary from embodiment to embodiment, and the present examples are illustrative. Those skilled in the art will appreciate numerous other ways of arranging and configuring the electrodes, which in turn may alter the specific shape and size and shape and arrangement of the respective electrode and sensor chambers.

In this embodiment, the lid panel 2200 is formed, cast, machined, cut, etched or otherwise configured to fit down onto and to contact certain points (e.g., 2202, 2203, 2204). The points of contact between the lower surface (e.g., 2202-2203-2204) of the lid panel 2200 and the electrolyte layer 2010 are made to be gas-tight to prevent the leakage of gas between the lid panel 2200 and the electrolyte 2010, and thus prevent gas leakage from one electrode chamber to the next. In this way we do not require an upper gasket (like 1300a, 1302a, 1304a shown before). The compliant gasket is thus disposed only on one side of the electrolyte, at 2300, 2303, 2304. Those skilled in the art will understand that the illustrated examples are merely representative and not exhaustive of the configurations possible within the scope of this disclosure and claims. For example, the gasket 2300, 2302, 2304 shown against the underside of electrolyte 2010 may be alternatively placed on the upper side of the electrolyte instead.

As stated elsewhere, an gas port through via 2500 (optionally covered with a filter 2600) is formed in one of the main panels of the device, e.g., in lid panel 2200, to permit access of gasses to the working electrode 2400 in its electrode chamber 2410, while the arrangement prevents the gas from leaking into or diffusing into the other electrode chambers 2412, 2414, 2416. In other embodiments, a second gas port may be made to allow gas passage to one of the other electrodes 2404, 2402, or 2406. In this case, the second gas port may be covered by a substantially similar filter material to 2600, a different filter to 2600 or no filter. Therefore, generally, a plurality of gas port through vias (with or without filtration) may be employed in some or all of the illustrated embodiments herein, or other embodiments as covered by the scope of this invention.

Figure 3:
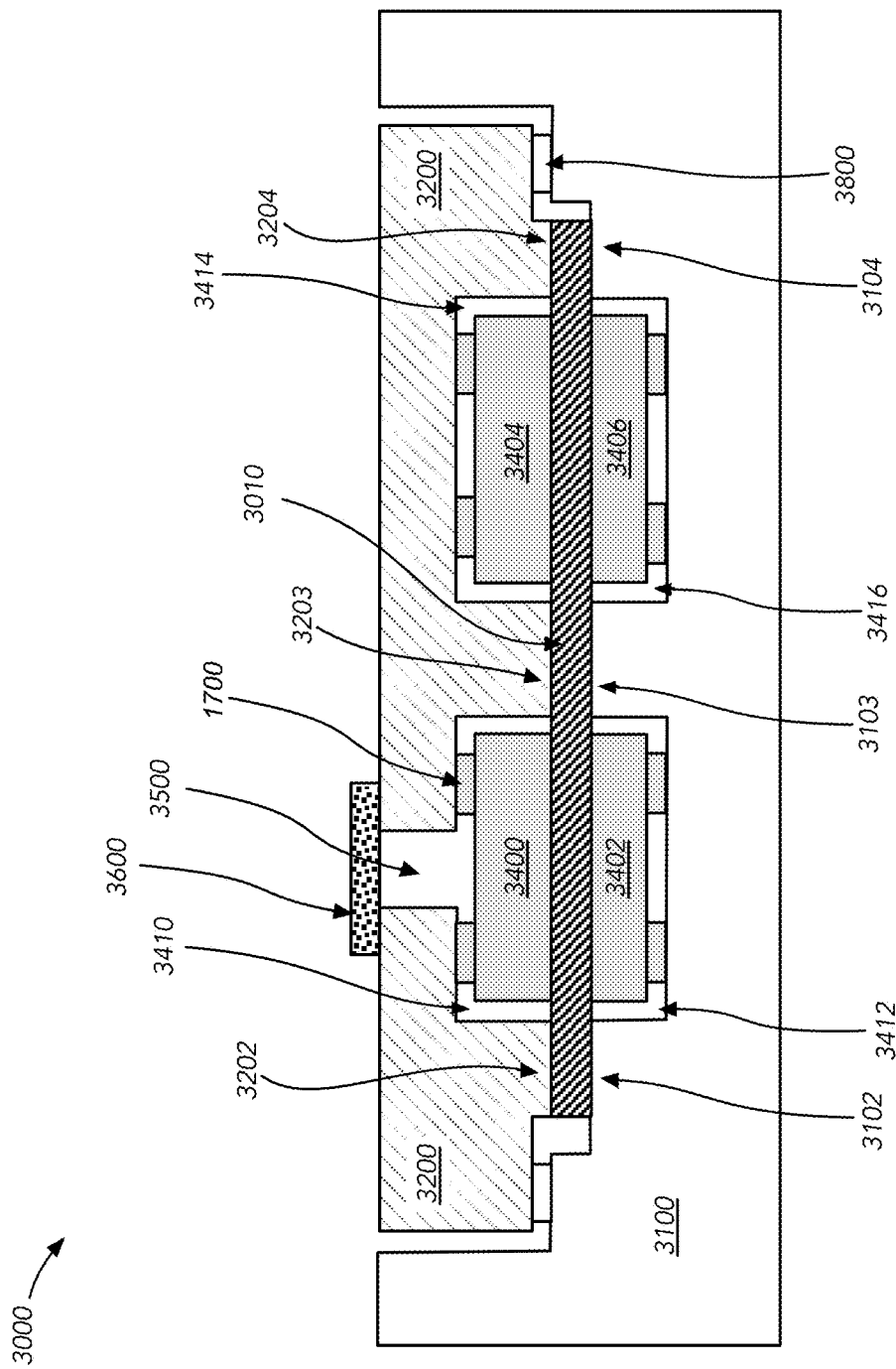
FIG. 3 is a cross-sectional view of an electrochemical sensor device, in accordance with one embodiment of the invention, comprising a sensor chamber defined by a package panel, a lid panel, electrodes, a solid or semi-solid electrolyte.

FIG. 3 illustrates an embodiment of an electrochemical sensor device 3000 based on a solid or semi-solid electrolyte 3010 in which all electrodes in the device are gas-isolated from each other so as to eliminate gas diffusion between them. In this embodiment, the electrolyte 3010 is held in compression against the package. Therefore, one can appreciate that in some or all embodiments, the electrolyte 3010 would be made to resist a certain amount of mechanical force or pressure, e.g., by not being a fluid electrolyte, but rather by being a solid or semi-solid material, which has certain solid/semi-solid material mechanical properties (e.g., density, stress-strain, hardness, non-pliability and so forth. More specifically, electrolyte 3010 contacts lid panel 3200 at upper contact areas 3202, 3203 and 3204, and contacts package panel 3100 at lower contact areas 3102, 3103 and 3104, whereby the electrolyte layer 3010 is pressed between said lid panel 3200 and package panel 3100. As can be seen, in this embodiment, no compliant gasket material is needed to isolate the electrode chambers 3410, 3412, 3414, 3416 from one another. Rather, gasketing is provided by the compression fit of the electrolyte between features on the package lid and body. In operation, gas entering the gas port through via 3500 (optionally through filter 3600) is confined to the working electrode 3400's chamber 3410.

As mentioned elsewhere, wherever four electrodes are shown in the present examples, electrochemical cells based on three electrodes (working electrode, counter electrode, and reference electrode only) and two electrodes (working electrode and counter electrode only) may be formed with nominally the same cell architecture.

Also, whereas the counter and reference electrodes in the above embodiments are disposed on the opposite side of the electrolyte to the working electrode, one or more of them may alternatively be disposed on the same side of the electrolyte as the working electrode. In addition, whereas the optional fourth electrode in the above embodiments are disposed on the same side of the electrolyte to the working electrode, it may alternatively be disposed on the opposite side of the electrolyte to the working electrode. Therefore, some or all of the electrodes in a given embodiment can be disposed on one and/or the other sides of the electrolyte material. Thus, some electrodes may be proximal to the cap panel while others are proximal to the package panel, but in alternate embodiments, all electrodes may be proximal to the cap panel or to the package panel.

Figure 4:
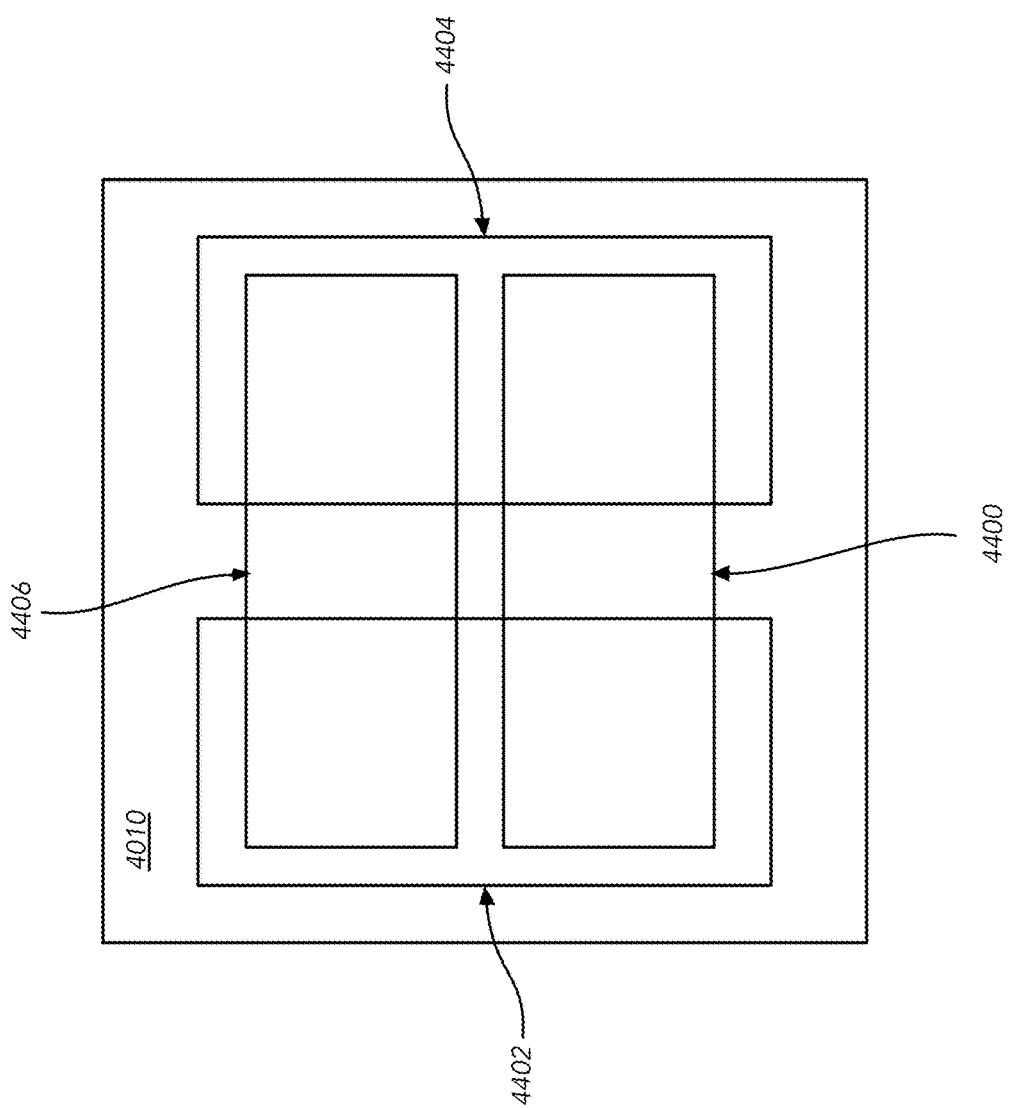
FIG. 4 is a plan view representation of an orthogonal relative orientation of the electrodes within an electrochemical sensor device.

FIG. 4 illustrates an exemplary a plan view depiction of the relative orientation of the electrodes (4400, 4402, 4404, 4406) and electrolyte 4010 according to one or more present embodiments. The electrolyte 4010 and electrodes may be as shown substantially planar with a generally rectangular plan view footprint. The electrolyte and electrodes may further be oriented as planar objects or slabs with substantially parallel faces (stacked) as illustrated in the various cross-sectional views, above. In one example, the reference electrode 4402 is positioned laterally with respect to the working electrode 4400 so as to at least partially overlap the working electrode 4400 (i.e., orthogonal thereto). In this case, the distance of closest approach between the working electrode 4400 and the reference electrode is determined by the thickness of the electrolyte 4010 and can be or the order of tens of microns or less. By so positioning the working and reference electrodes, the impedance between the two electrodes may be minimized, thereby enabling the cell to respond rapidly to a change in applied bias.

In the non-limiting example, the counter electrode 4404 is also positioned laterally with respect to the working electrode 4400 so as to at least partially overlap the working electrode. In this case, the distance of closest approach between the working electrode 4400 and the counter electrode 4404 is determined by the thickness of the electrolyte 4010 and can be or the order of tens of microns or less. Again, by so positioning the working and counter electrodes, the impedance between the two electrodes may be minimized, thereby enabling the cell to stabilize rapidly and react rapidly to any change in state of the working electrode.

Whereas all electrodes in some illustrations are depicted as being of nominally similar size and shape, the relative shapes and sizes may be varied so as to optimize the cell for particular application. For example, maximizing the size of the working electrode may maximize the sensitivity and minimum detectivity level of the cell; reducing the size of the reference electrode may enable reduced parasitic or leakage currents—resulting in an increase in linearity of sensitivity of the cell—whilst minimally impacting the response of the cell to changes in applied bias.

Figure 5:
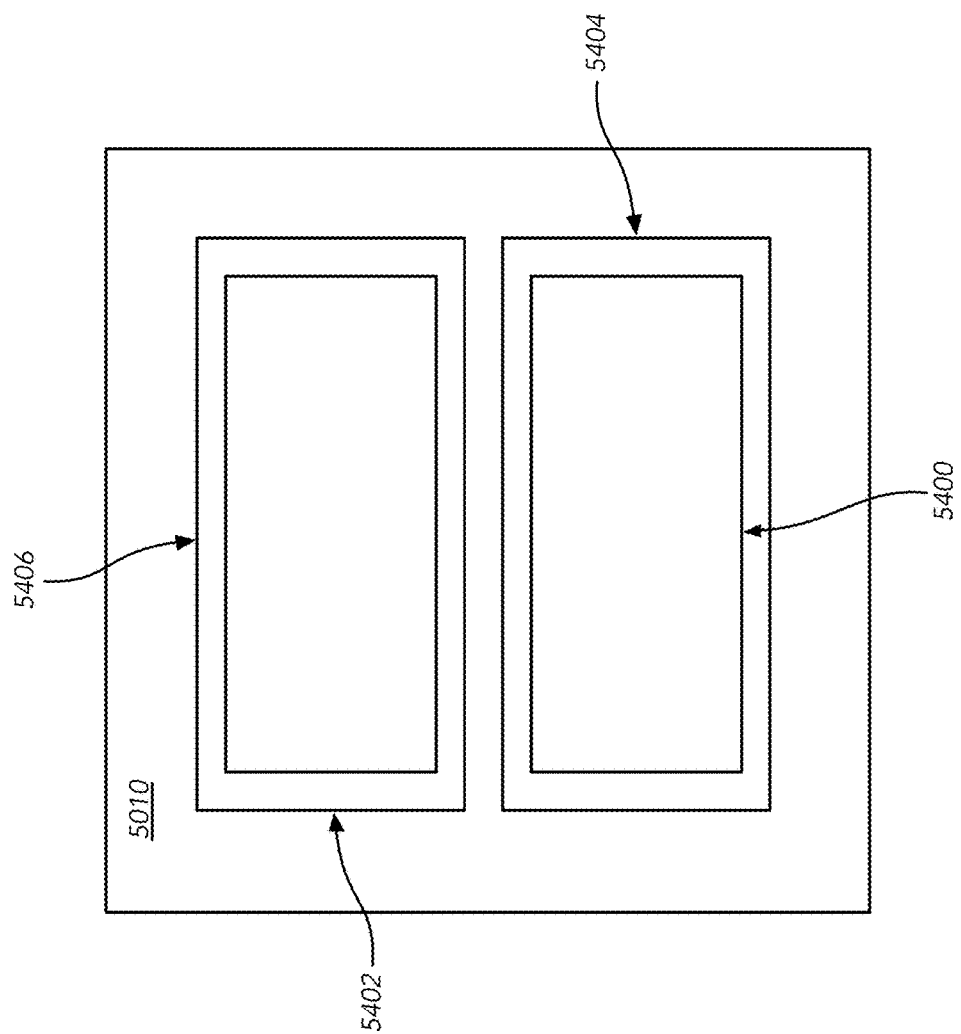
FIG. 5 is a plan view representation of a parallel relative orientation of the electrodes within an electrochemical sensor device.

FIG. 5 illustrates an alternative plan view of the electrolyte layer 5010 and electrodes (5400, 5402, 5404, 5406) of a given sensor device. The counter electrode 5404 is positioned laterally so as to directly overlap the working electrode 5400. By so positioning the working and counter electrodes, the impedance between the two electrodes may be minimized, thereby enabling the cell to respond most rapidly to a change in state of the working electrode. In yet another embodiment, the position of the counter electrode 5404 and reference electrode 5402 may be interchanged so that the impedance between the two electrodes may be minimized, thereby enabling the cell to respond most rapidly to a change in applied bias.

This example may be preferred for some applications insofar that it allows to independently tune the impedance between the upper and lower electrodes (by changing the thickness of the electrolyte) and the impedance between laterally displaced electrodes (by changing the space between the electrode pairs). It is to be appreciated that the particular designations of electrodes (working, reference, counter electrodes, etc.) are not limiting with regard to this aspect of the invention, i.e., the relative orientation of the electrodes. So, in an example, we may apply the reference electrode as shown in the illustration at 5404 while applying the counter electrode as shown in the illustration at positions 5406 or 5402. These non-limiting examples can reduce or minimize the response time and the electrical stability of the sensor.

Therefore, it is within the present invention and its various embodiments to interchange the position of the electrodes and the distances between them in order to optimize a given sensor device for different functions. Other design considerations that can be taken into account for deciding on electrode relative orientation is to consider a best gasketing layout, as the gasket positions may overly each other to provide counter-pressure against each other to provide a desired mechanical gas seal.

Each electrode may thus be configured and arranged as a substantially planar member lying substantially in a plane, said plane being generally parallel to the planes 1101 and 1201 of the base and lid panel elements. The electrodes as such may be elongated rectangles and have one set of sides thereof longer than the other set of sides as shown in FIGS. 4 and 5. The elongated flat or planar electrodes may overlap one another at least in a portion of their areas (viewed in plan view) as described, for example with the electrolyte 4010/5010 separating the overlapping electrodes. Furthermore, the overlapped areas can be such that the electrodes overlap the working electrode by being oriented in parallel to the working electrode (FIG. 5) or orthogonal to it (FIG. 4) within their respective planes. In the case that all electrodes are within one plane, one or more of the electrodes may be square.

Figure 6:
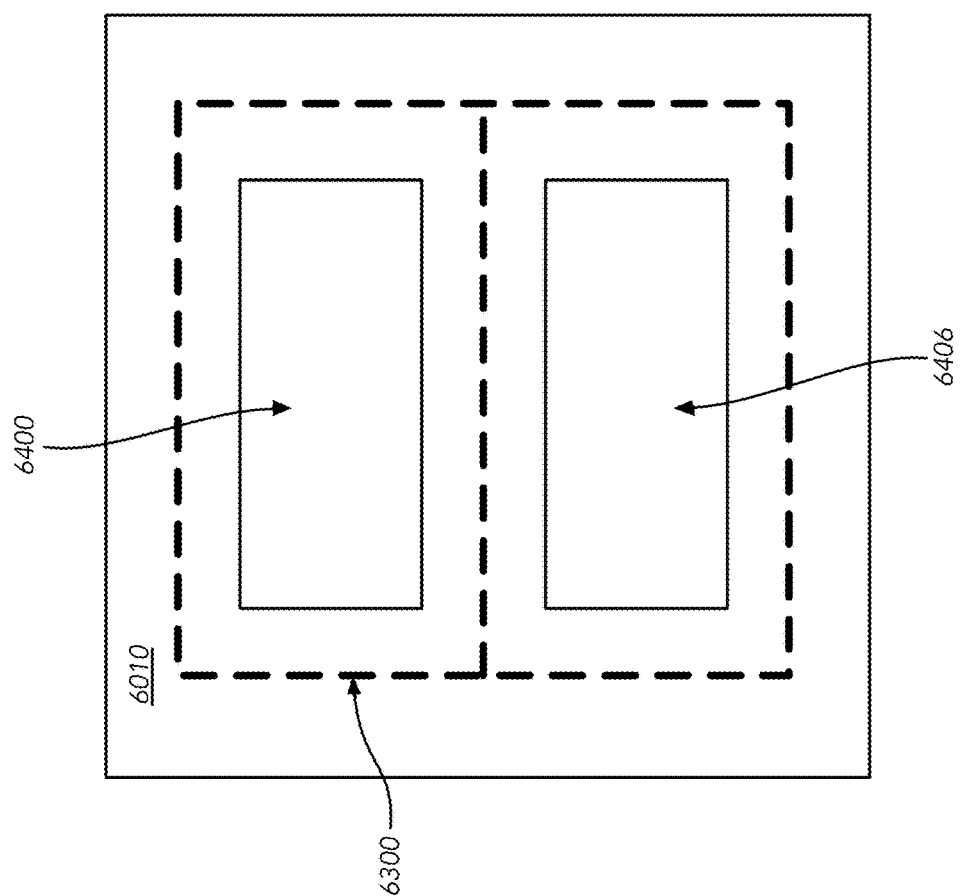
FIG. 6 illustrates a gasket material used to gas-isolate one or more sensor electrode chambers.

FIG. 6 illustrates a simplified plan view of some elements of an electrochemical sensor device as described herein. The sensor includes an electrolyte layer 6010 contacting a plurality of electrodes, e.g., 6400, 6406. The electrodes in use are disposed in electrode or sensor chambers as described and are gas isolated with a gasket material 6300. It is seen in this simple exemplary embodiment that the gasket material 6300 can be applied as a bead around one or more of the electrodes and may contact the electrolyte as appropriate for a given installation. Specifically, a working electrode 6400 may be gas-isolated on its own in an electrode chamber in communication with an outside gas environment through a gas port through via as described earlier. An auxiliary electrode 6406 may also optionally be gas-isolated on its own in an electrode chamber in communication with an outside gas environment through a gas port through via as described earlier.

The making of the present devices can be done using a variety of steps and processes, some of which are known to those in the chip manufacturing, chip packaging, microelectronics, and related industries.

Figure 7:
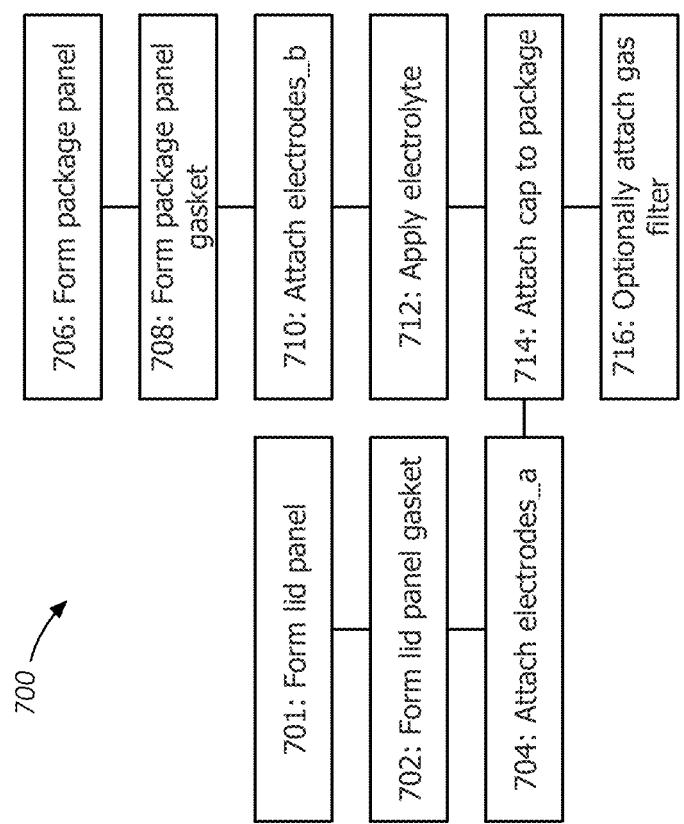
FIG. 7 illustrates an exemplary method for making one or more sensor devices according to the present disclosure.

FIG. 7 illustrates an exemplary method 700 for making the present devices. The steps recited may include optional steps that those skilled in the art would omit or substitute in some applications, and other auxiliary acts may be further included, or performed in a different order as suits a particular need without departing from the scope of this invention For example, at 701 the lid panel is formed. The package panel is formed at 706. The gasket(s) as needed are formed at 702 (cap side) and at 708 (base side), recalling that gaskets are not always necessary on one and/or both sides of the electrolyte as discussed. Any through vias are also formed at a suitable time. The electrodes are attached to the upper and/or bottom sides at 704 and 710. The electrolyte is applied in the sensor at 712. The cap and package panels are attached or bonded or coupled to close the device at 714. The optional gas filter is attached over the gas port through via at 716. For example, step 716 may be performed at any point between step 706 and step 714 in the flow depicted in FIG. 7.

In one or more embodiments, a common panel that is larger than one single electrochemical sensor device is used to create an array or large number of such sensor devices thereon. As stated, the panel can then be singulated to create the individual single sensor devices therefrom. However, in one or more embodiments, several sensor devices are together used to form a multi-sensor device that includes the several sensor devices all together. For example, if each such individual sensor of the multi-sensor device is useful for detecting a respective gas, then the multi-sensor device can detect several gases, each with the respective sensor. If the devices are formed from large common panels, the panels may be cut or diced to make such multi-sensor devices, for example in a 2×2 sensor array, a 4×2 array, a 2×4 array, and so on.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. An electrochemical sensing device, comprising:
a package panel;
a lid panel;
a solid or semi-solid electrolyte;
a plurality of electrodes disposed in one or more electrode chambers, each electrode in contact with said electrolyte;
the plurality of electrodes, at least one of which is in gas communication with an outside environment through a gas port through via in one of said panels; and
a seal gas-isolating at least one electrode chamber from any other electrode chambers, wherein:
said electrolyte comprises an electrolyte layer disposed between said package and lid panels in substantially parallel planes,
said electrodes furthermore comprising planar structures in contact with said electrolyte layer on at least one side thereof,
one or more of said electrodes is oriented and positioned so as to have an overlapping area separated from a working electrode by said electrolyte layer,
said one or more electrodes overlapping the working electrode oriented orthogonally within their respective planes to said working electrode.

2. The device of claim 1, wherein the lid and package panels are at least partially bonded to one another with an adhesive material.

3. The device of claim 1, said electrodes and electrolyte comprising an electrochemical sensor disposed within a sensor chamber at least partially defined by said lid and package panels, the electrochemical sensor being electrically biased through one or more electrical contact points, and delivering an electrical sensor output signal responsive to a chemical interaction with one or more of said electrodes, said electrolyte and a sensed gas within said electrode chambers.

4. The device of claim 1, comprising a plurality of electrode chambers including a working electrode chamber, the plurality of electrode chambers being gas isolated from one another to substantially prevent leakage or diffusion of a gas among said electrode chambers.

5. The device of claim 4, said electrolyte comprising a solid or semi-solid layer disposed between at least two such electrode chambers, the electrolyte layer acting to block gas diffusion between said at least two such electrode chambers.

6. The device of claim 1, said seal comprising a gasket material to achieve said gas isolation.

7. The device of claim 6, said gasket material comprising any of:
fluoropolymer, fluorosilicone, polyimide, butyl or other rubber compounds, a rubber derivative, epoxy, a silicone, and an acrylic substance.

8. The device of claim 1, said seal disposed between portions of said package and lid panels to block gas diffusion between one or more electrode chambers and any other electrode chambers of said device.

9. The device of claim 1, said seal disposed between portions of said package or lid panels and said electrolyte to block gas diffusion between one or more electrode chambers and any other electrode chambers of said device.

10. The device of claim 9, said seal comprising a gasket material to achieve said gas isolation.

11. The device of claim 1, said lid and package panels contacting one another at portions thereof so as to block gas diffusion between at least one electrode chamber and any other electrode chambers of said device.

12. The device of claim 1, further comprising a gas-permeable filter that filters gas passing through said gas port through via.

13. The device of claim 1, further comprising a plurality of electrical contacts and conductive through vias coupling said electrodes to respective exterior connection points on said device.

14. The device of claim 13, further comprising an integrated circuit disposed on an exterior face of said device and electrically coupled to said electrical contacts.

15. The device of claim 14, said integrated circuit comprising an application specific integrated circuit (ASIC).

16. The device of claim 1, further comprising at least one additional gas port through via in any of the package or lid panels, said at least one additional gas port putting a respective electrode of said device in gas communication with the outside environment.

17. The device of claim 1, said at least one electrode chamber being gas isolated comprising a working electrode chamber.

18. The device of claim 1, said at least one electrode chamber being gas isolated comprising a reference electrode chamber.

19. A method for making an electrochemical sensor device having a plurality of sensor electrodes, comprising:
forming a package panel;
forming a lid panel;
creating a plurality of through vias in at least one of said lid and package panels, including a gas port through via that connects at least one electrode chamber containing a respective electrode with an exterior environment;
forming one or more gas seals on an interior face of at least one of said panels to gas-isolate at least said at least one electrode chamber from any other electrode chambers;
attaching electrical contacts to one or both of said lid and package panels;

forming a solid or semi-solid electrolyte layer disposed between a plurality of electrodes, including said at least one electrode and another electrode; and mating an interior face of said lid panel and an interior face of said package panel so as to define said electrode chamber and any other electrode chambers, wherein the respective electrode and other electrodes are simultaneously contacting the solid or semi-solid electrolyte layer; and orienting at least one other electrode orthogonally to a working electrode, in respective parallel planes, and separated therefrom by said electrolyte layer.

20. The method of claim 19, further comprising sealing one more of said electrode chambers with a gasket in direct contact with said electrolyte.

21. The method of claim 19, further comprising applying an adhesive to bond said lid and package panels at selected locations.

22. The method of claim 19, further comprising installing a gas filter on said gas port through via.

* * * * *